Nov. 4, 1969 A. P. FELDMAN 3,476,311
TWO-DIMENSIONAL STRUCTURE ENCODING TYPEWRITER
Original Filed Feb. 26, 1963 7 Sheets-Sheet 1

INVENTOR.
ALFRED P. FELDMAN
BY
ATTORNEY

*INVENTOR.*
ALFRED P. FELDMAN
BY
*Harvey S. Boyd*
ATTORNEY

Nov. 4, 1969   A. P. FELDMAN   3,476,311
TWO-DIMENSIONAL STRUCTURE ENCODING TYPEWRITER
Original Filed Feb. 26, 1963   7 Sheets-Sheet 3

INVENTOR
ALFRED P. FELDMAN

BY *Harvey S. Boyd*

ATTORNEY

Nov. 4, 1969   A. P. FELDMAN   3,476,311
TWO-DIMENSIONAL STRUCTURE ENCODING TYPEWRITER
Original Filed Feb. 26, 1963   7 Sheets-Sheet 6

INVENTOR
ALFRED P. FELDMAN

BY *Harry S. Boyd*

ATTORNEY

Nov. 4, 1969    A. P. FELDMAN    3,476,311
TWO-DIMENSIONAL STRUCTURE ENCODING TYPEWRITER
Original Filed Feb. 26, 1963    7 Sheets-Sheet 7

INVENTOR

ALFRED P. FELDMAN

BY *Harvey S. Boyd*

ATTORNEY 3,476,311
TWO-DIMENSIONAL STRUCTURE ENCODING TYPEWRITER
Alfred P. Feldman, 1440 Locust Road, NW.,
Washington, D.C. 20012
Original application Feb. 26, 1963, Ser. No. 261,238, now Patent No. 3,358,804, dated Dec. 19, 1967. Divided and this application June 9, 1967, Ser. No. 660,849
Int. Cl. G06k *1/10, 1/14;* B41j *3/534*
U.S. Cl. 234—17                                    8 Claims

ABSTRACT OF THE DISCLOSURE

A Cartesian coordinate position encoding typewriter including horizontal and vertical position sensing apparatus responsive to the typing of a symbol for providing output signals indicative of the Cartesian coordinates of each typed symbol to encoding apparatus which converts the signals into a suitable code for recording. Apparatus is also provided for sensing the typed symbol, coding the symbol and recording the code together with the position coordinate codes.

---

The invention described herein may be manufactured and used by or for the Government for governmental purposes without the payment to me of any royalty thereon.

This is a divisional application of my co-pending patent application, Ser. No. 261,238, filed Feb. 26, 1963, now Patent No. 3,358,804 and relates to improvements in typewriters and more particularly in structure encoding typewriters the coding of diagrams of chemical structures and analogous diagrams, questionnaire recording machines, means for gaining access to a computer memory, and methods for composing diagrams for complex formulas on linotype or similar type machines, and, in general, the simultaneous recording of information and position. While the specific embodiment included herein is of the tape punching variety, this invention is equally applicable to magnetic tapes and to tapeless on-line communication with a computer.

As used herein the word "code" defines a system whereby symbols and locations of symbols are given signals for communication purposes. The salient communication purpose assigned under the instant invention is that of generating a code for certain stylized two-dimensional representations, or for applications where the location in a two-dimensional frame of reference is of importance.

In the sense that the word "formula" denotes a number of figures, symbols, etc., associated to express briefly a single or multiple concept, this invention relates to a formula encoding typewriter. "Structural formulae" notwithstanding, the word "formula" is also used in chemistry (a field to which this particular typewriter is ideally suited and for which the preferred embodiment was designed), to connote chemical compounds by their constituent elements and showing none or only part of the structural relationship of these elements. An empirical formula, for example, fails to show a full two-dimensional structure. Chemical typewriters have been developed to record only specific types of symbols. Typewriters have also been developed for the recording of each typed symbol, in code form, on a perforated tape. However, no typewriter has yet been developed which can record, in code form, a symbol on a perforated tape, and, at the same or substantially the same time, record in code form the position of the typewriter carriage with respect to the typewriter chassis and the position of the typewriter platen with respect to the typewriter carriage. It is therefore an object of the instant invention to provide, in a tape perforating encoding typewriter, the means for recording, as to a given symbol, the abscissa and the ordinate of said symbol.

Having thus provided for the encoding of the ordinates and abscissas of each section symbol, I have then provided for the coding of two dimensional structural formulae.

Briefly and generically described, my invention is comprised essentially of four elements. The first element is a printing device such as a tape punching typewriter or a card punching unit. This element must, of course, have the capability of typing the desired structural symbols. For example, if the purpose of the specific device were to type structural formula, the keyboard would contain the common chemical element symbols, symbols for bonds between elements, and certain commonly used components of various chemical compounds. Commercially available chemical typing keyboards are available for this purpose. If the typewriter is to encode electrical circuitry, for example, such commonly used symbols as a resistor, condensor, and relay, should be available on the keyboard. In lieu of the tape punching typewriter or card punching unit, a printing machine with a simultaneous tape output such as is currently commercially available may be used as the first element of this invention.

The second element of my invention is a set of sensing devices for sensing both the $x$ and $y$ coordinates of the symbols typed. Upon a demand signal, a wiper or brush either movably mounted with respect to the fixed commutator or mounted in a stationary position with respect to a moving commutator will sense the relative position between the carriage and the chassis of the typewriter and between the platen and the carriage of the typewriter. The sensing devices may be a pair of commutators with as many sets of contacts as there are positions. Impulses obtained through these brushes would then be coded through an appropriate diode matrix or similar device as illustrated in the preferred embodiment. Sensing can also be done by electric contacts coursing over a printed circuit or micro switches actuated by cams, and laid out in such a way that the code for each position is generated directly. Sensing and signaling can be accomplished as described immediately above by use of a "demand" current generated by the depression of a type bar, or by means of a feeler contact brought into the feeling or sensing position by the "demand" current. Coordinates can also be obtained in coded form through the use of analogue-to-digital convertors which are commercially available, as well as by means of a series of counter or step switches having as many positions as there are $x$ and $y$ coordinates.

The third element of my invention is a sequencing device which may be required to properly and appropriately hold off or delay the coordinate code signals which are generated at the same time as the code of the printed character. If a standard computer tape is to be utilized, these code signals must be recorded in sequence. Sequencing can be accomplished either at the time of printing or subsequently thereto. If sequencing is to be accomplished at the time of printing, high speed sequencing equipment must be used so as not to unnecessarily delay a printing cycle. If a tape is used which will at the same time accommodate coordinate codes as well as symbol codes, the sequencing may be later accomplished, speed being relatively unimportant. It should be noted in this connection that with commercially available components, punching action is or can be made faster than typing action. Therefore, it is feasible for the coordinate codes to be stored temporarily when obtained, and punched out during the remainder of the mechanical action and reset cycle of the typewriter as is done in the preferred embodiment described below. Storage of coordinate codes may be accomplished by fixed time-delay relays, by memory relays connected to a step switch which is actuated by the tape perforator, by memory relays connected to a relay counting circuit, or by commercially available ready-made equipment for specifically obtaining such sequencing.

The last element of my invention may be described generically as a means to convert the codes generated and stored above into useable format. Needless to say, the above components do not provide for the actual punching of a tape or the further utilization of the data created. Typewriting machines which are commercially available are capable, not only of punching tapes, but of reproducing on the typewritten paper, that material which is fed into the combination in punched tape form. This invention is not, however, limited to the tape punching and retyping machine. Data produced as generally described above may be fed directly into computers, and, by means of suitable programs be used for an infinite number of applications.

Inherent in the above, is full freedom of operational movement as between chassis and platen and between carriage and platen. No punch action is dependent upon prior relative position between platen or carriage and chassis. Each action is absolutely independent. Therefore it matters not what the preceding punch represents or how the platen or carriage came into position.

As will be seen below, the specific preferred embodiment of this invention is a means of sensing coordinates and using these coordinates to encode chemical structure. Chemical codes can be broadly divided into two categories, i.e., descriptor codes and exhaustive codes. Descriptor codes give data for each compound sufficient only for dividing collections of compounds into small groups of given characteristics. While satisfactory for many purposes, descriptor codes exhibit insufficient detail for distinguishing many similar chemical compounds. In other words two compounds may have the same descriptor code but may differ structurally. Exhaustive codes, on the other hand, involve the assignment of sufficient symbols for complete reconstruction. While the exhaustive code is indeed more versatile than the descriptor code, the process of encoding and decoding it is time consuming and subject to error. The use of an exhaustive code also frequently requires expensive computers, as contrasted with the inexpensive sorting equipment which can be utilized for descriptor codes.

In adapting my invention for the encoding of chemical compounds, I have devised a chemical encoding system utilizing an exhaustive code which is capable of accomplishing the purposes of this invention and is also suitable for use with computers. This code is an improvement and refinement upon a code developed by Calvin Mooers, known as the "Zatopleg." The code utilizes the typical structural formula with which chemists are familiar, as contrasted to modifications of the chemical formula for the purposes of convenience to the machine or to the computer. Thus it is possible for a person using such a chemical encoding typewriter, to chemically encode simply by copying upon the typewriter a formula presented to the operator. The operator need know nothing about the code nor have any scientific or chemical knowledge. Another characteristic of this modified Zatopleg system is that a mistake in the encoding process will appear on the typewritten page as a mistake in the conventional structural chemical formula, easily detectable by a chemist.

According to the Zatopleg system, a random number is attached to each atom, which number cannot be assigned more than once within a molecule. This would be followed by lists showing which other atoms each atom is linked to. Therefore a Zatopleg code for one atom of a molecule would consist of: first, an arbitrary number assigned to the atom within the molecule; second, an identification number for the kind of atom (e.g. its atomic number); and, third, the numbers of the atoms to which it is connected. In my modification of the Zatopleg code, I use the Cartesian coordinates of each atom based upon its location on a fixed grid, in lieu of the arbitrary assigned number of the Zatopleg system. These coordinates are, of course, as indicated above and as described in detail below, generated automatically by the sensing devices which sense the position of the typewriter carriage with respect to the typewriter chassis and the position of the typewriter platen with respect to the typewriter carriage. With this information, a computer can generate the lists of the Zatopleg system, or any other suitable referencing procedure. Briefly, my invention generates this code (or, more accurately, that taped information which corresponds to this code) as follows: first, when a key is depressed, a coded signal, corresponding to the key, is sent to a tape perforater, and an uncoded demand signal is sent to both position sensing elements. These elements convert the demand signal into coded signals corresponding to the carriage-to-chassis position ($x$-coordinate), and the platen-to-carriage position ($y$-coordinate); second, these signals are then sent, in turn, to the tape perforator which punches the tape so that the coordinates appear alongside the punch corresponding to the atom to which they pertain.

Actual generation on tape of this type of information, according to my modification of the Zatopleg system, is illustrated at FIG. 17.

The showing of chemical bonds, according to this encoding system, involves simply the assignment of a code symbol for a given type of bond, which bonds are illustrated, as they appear in the conventional chemical structural formula, on the key itself. The above described code lends itself to the use of aggregates, in lieu of individually typed atoms, where the use of such aggregates are desirable in a frequently recurring portion of a structure. Fragments of structures can be typed out and thus prepunched in such a way that they can be used to avoid retyping a same fragment several times. The code also lends itself to transposition into any other descriptor or exhaustive type chemical code through a suitable computer program.

It is therefore an object of this invention to provide in an encoding typewriter, having the ability to sense and record Cartesian coordinates of elements of structures, a coding system suitable for chemical conventional structural formulae.

Other advantages and objects of this invention will be obvious to those skilled in the art upon examination of the following drawings wherein.

Figure 1:
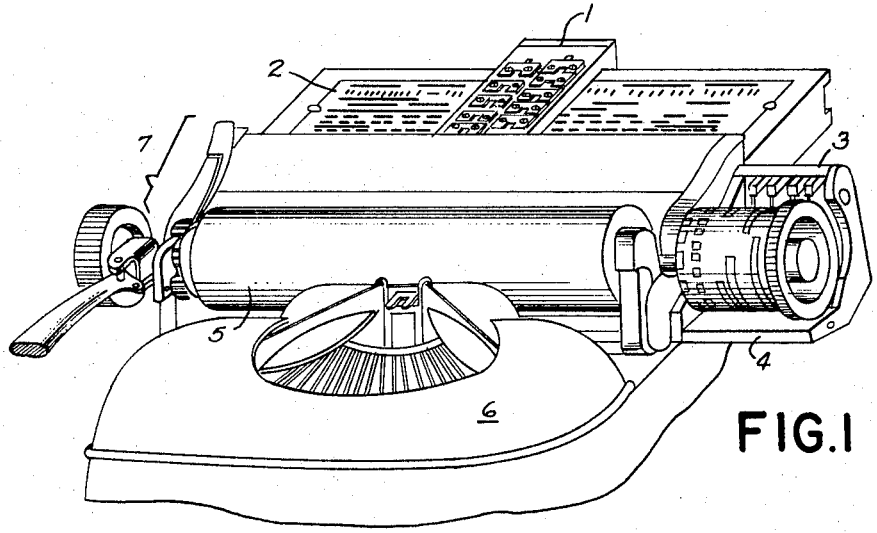
FIG. 1 is a perspective partially schematic diagram of a Cartesian coordinate sensing typewriter.

FIG. 1 shows schematically the first embodiment of my Cartesian coordinates sensing device for typewriters. This diagram is intended to show, not the structural details of the device, which details are explained below, but to present the physical relationship between the various elements of this combination. Commutator brush support 1 is rigidly affixed to typewriter chassis 6. The $x$-commutator 2 is affixed to and moves with carriage 7. The $y$-commutator brush support 3 is affixed to and moves (horizontally only) with carriage 7. The same results may be obtained by affixing commutator 2 to chassis 6 and brush support 1 to carriage 7. The $y$-commutator 4 moves rotatably with platen 5 as well as horizontally with carriage 7. In this manner the $x$-coordinates may be sensed by brushes on $x$-commutator brush support 1 making contact with $x$-commutator 2, this relationship, in reality, fixing the relative position between the carriage and the typewriter chassis. The $y$-coordinates are sensed by brushes on brush support 3 making contact with commutator contacts on $y$-commutator 4, thus sensing the relative position between the platen and carriage 7. Generically this sensing device may be used with an conventional typewriter which is suitable for typing the structures to be encoded; that is to say, having chemical type bars where chemical encoding is desired, and having appropriate elements for the utilization desired of the symbol codes and the coordinate codes. These commutators are not commercially available but can be made by skilled technicians in accordance with this invention. Commutators may be made of Bakelite plates and should be placed in such a way that at any of the positions in which the carriage may stop, there will be two or more closed circuits. If a demand signal happens to be sent through these closed contacts, a signal will then be coded for the particular position of the carriage or the platen.

Figure 2:
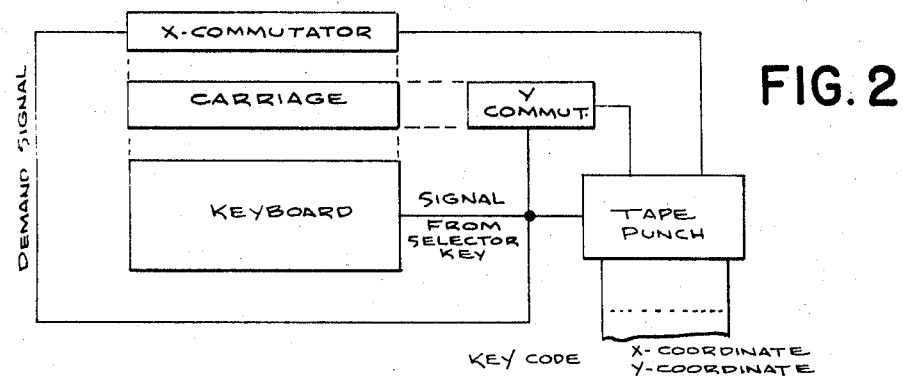
FIG. 2 is a schematic diagram of one embodiment of my invention.

FIG. 2 shows schematically how a typewriter may be adapted according to the instant invention, for use with a wide tape, allowing direct wire contact from the code selector of the typewriter to the individual punches of the tape perforator. Using the tape wide enough to accommodate 23 channels, for which tape there are commercially available perforators, 8 channels may be allocated directly for keyboard information, 8 channels for $x$-coordinates and 7 channels for $y$-coordinates.

The wide tape illustrated at FIG. 2 is incompatible with most commercially available computers. I have therefore devised a time delay system, shown schematically at FIG. 3, which enables the punching operation to be sequenced, and therefore to be punched on a narrow tape with a speed perforator, such as those commercially available, which can operate several times during the mechanical cycle of the typewriter; that is to say, during the period of time during which a key is struck, the carriage is repositioned, and the typewriter returns to the position of rest. This is achieved by transmitting only the signal from the typewriter code selector directly to the tape perforator. Signals from the $x$-commutator are delayed for a period of time to allow the punching of the key symbol code. After the punching of the $x$-coordinate code the signal for the $y$-coordinate code times in and is punched sequentially. The demand signals are controlled, as shown, through a normally closed contact on a signal from the selector key. After the demand signal, which is instantaneous, the normally closed contact is opened and remains open until reset by a signal from the $y$-commutator delay circuit. The interlock prevents the input of new data until the information has passed on to the punch. If the perforator can operate at sufficient speed, the additional punches will not slow down the typing speed.

Figure 3:
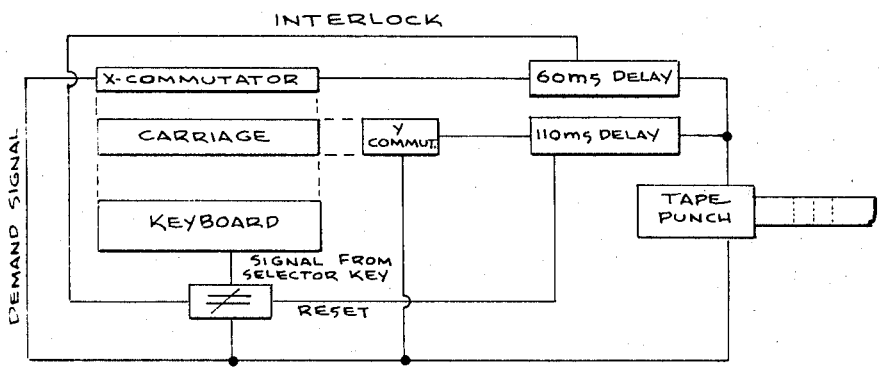
FIG. 3 is a schematic diagram of a second embodiment of my invention.
Figure 4:
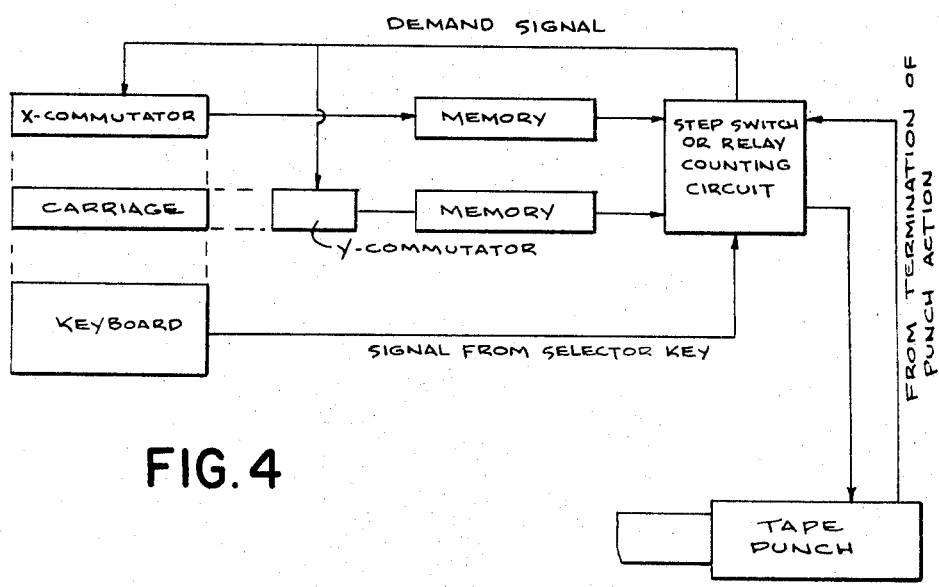
FIG. 4 is a schematic diagram of a third embodiment of my invention.

In lieu of the arrangement shown at FIG. 3, the signals from the $xy$-commutators may be stored in a memory unit consisting of relays, of magnetic-core elements, of thyratrons, etc. These signals are given up upon demand by a step switch or relay counting circuit, as shown schematically in the block diagram of FIG. 4. Each tape perforator action is marked by a signal to the step switch or relay counting circuit which, in turn, causes the information stored in either of the memory circuits to be released.

Figure 5:
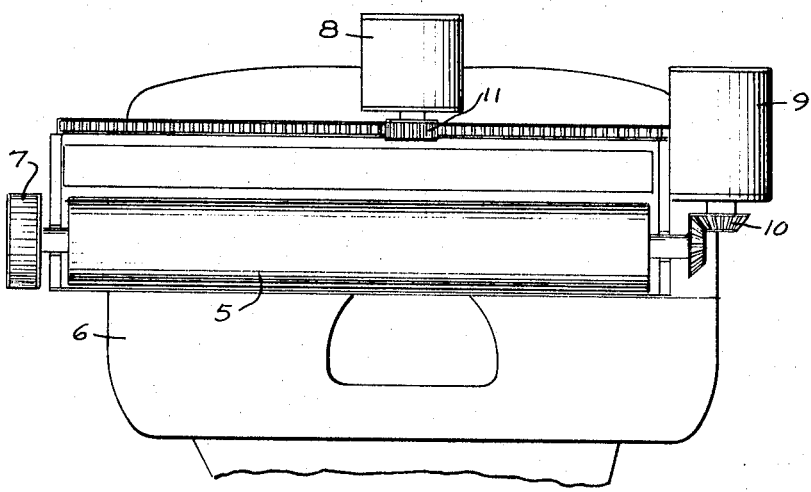
FIG. 5 is a structural partially schematic diagram of an alternate Cartesian coordinate sensing modifications for a typewriter.

FIG. 5 shows schematically the use of commercially available digitalizers 8 and 9 in conjunction with the typewriter for the sensing of $x$ and $y$ position coordinates, which can be used in lieu of commutators and brushes as described generically above and in detail below. The digitalizers can be fixed as shown in FIG. 5 or moving and in contact with a fixed gear. One digitalizer is geared in by means of bevel gears 10 with the turning of the platen while the second digitalizer is geared in with the carriage by means of rack and pinion gear 11. While commercially available digitalizers are suitable for this purpose, it should be noted that in this embodiment not all capabilities of the digitalizers are utilized, that is to say, the function of transformation of analog into digital data is, of course, omitted in its utilization with this embodiment for the reason that the output of the typewriter is already in digital form.

Counting switches can also be used to replace the commutators described above and below. No drawings are shown to describe the use of counting switches. Their disposition would be the same as that of the digitalizers.

In connection with FIGS. 2–9, it may be noted that the coded tape does not appear to correspond with the modified Zatopleg code described supra in the specification. The reason for this is that, if so desired, the Zatopleg code may be obtained through a computer, for which a set of instructions can be programmed for each key on the keyboard of the typewriter. For example, if a "C" has been typed, the computer will store the coordinates of the letter along with the atomic number 6 of carbon (in chemical usage), and then collect the coordinates of the other atoms to which the four carbon valency linkages extend. If, on the other hand, a "/" had been typed, the computer will not store it as such, but will transmit to the atom a line below and a space to the left, the number of the atom a line above and a space to the right. In terms of the code this indicates that these two atoms are linked together. Such computer programming, as well as the actual utilization of a computer in this system, does not go to the essence of this invention, information concerning which is included only to show how the new matter relates to the basic apparatus and to elements upon which improvements have been made.

Figure 6:
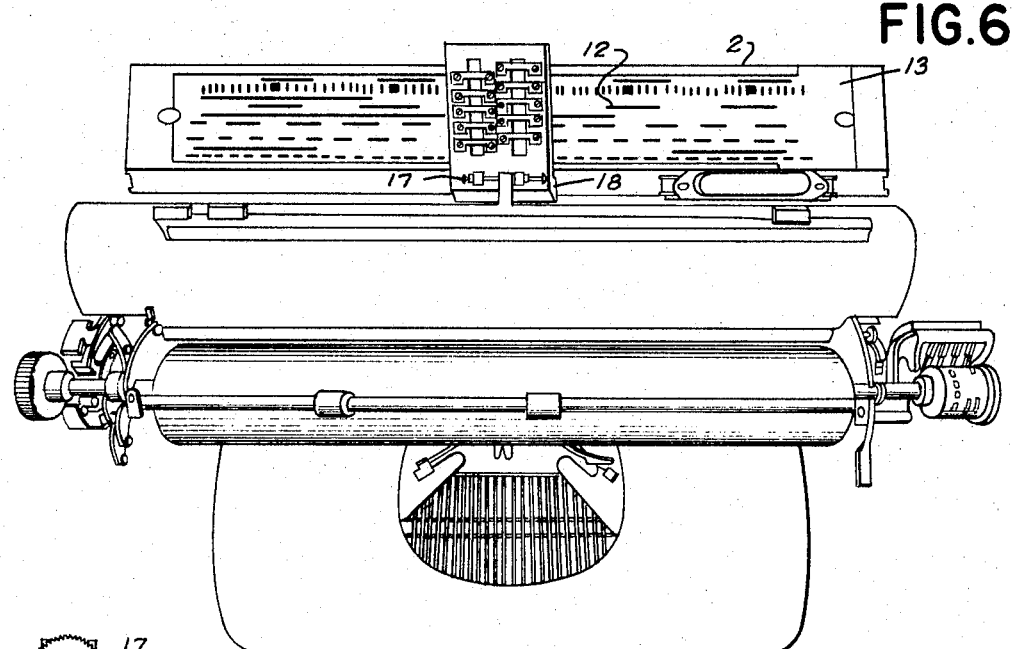
FIG. 6 is a top plan view of the $x$ (planar) commuter mounted on the typewriter.

FIG. 6 shows in detail at 2 the structure of a commutator surface which was engineered for the modification of a commercially available chemical typewriter. This commutator is, of course, the horizontal sensing $x$-coordinate commutator for use with the brush structure shown at FIG. 7. Essentially the commutator surface is of an insulating material such as Bakelite within which is embedded metallic dots or bars which are connected, through electrical conductors to a common ground. The carriage of the typewriter for which this commutator has been engineered, has 168 discrete horizontal (or $x$) positions. Metallic bars 12 representing a modified Gray code are embedded in the Bakelite base 13 for translating this binary code into electrical signals. The Gray code is well known to those skilled in the art. The Gray code, of course, is, in every case, modified to suit the typewriter and the particular usage to which the typewriter is put. With respect to the embodiment shown in FIG. 6, the situation of the metallic dots or bars, according to the Gray code, as modified by the instant invention, will be called the "Gray plus Parity" system.

The typewriter carriage may, of course, stop at a certain number of discrete horizontal locations; and the platen may stop at a certain number of discrete positions. In order to communicate these positions to a computer, it is necessary to encode them; and a suitable code is constituted by a pattern of perforated holes on a paper tape. Obviously the same pattern should not be repeated for two different locations because these two locations then become indistinguishable to the computer. In order to determine how many spaces for holes it is necessary to reserve, in order to generate a sufficient number of different patterns for all possible carriage and platen positions, it is necessary to use the formula $X=2^n$, with $X$ as the number of patterns that can be obtained and "$n$" as the number of positions needed for holes. Thus, if "$n$" is equal to 6, spaces for 6 holes may be reserved across a paper tape, and 64 different patterns of spaces and holes will be obtained, and the maximum number of carriage or platen locations that can be coded is 64 spaces.

As long as no two different locations are assigned an identical code, it matters not how these codes are distributed. Suffice it to enter a transformation table into the computer, telling it that a certain pattern corresponds to No. 1; another pattern to No. 2 and so forth. Alternately, one may proceed in a more methodical fashion in assigning patterns to locations. Binary numbers which are easily expressed in terms of holes and blanks may be used, and a computer can take them without transfromation. The Gray code, requiring a transformation table, is utilized in the preferred embodiment because, of all the code arrangements, it uses the smallest number of metallic surfaces. The illustration below is a comparison of machined binary and Gray codes. It will be noted that the binary uses seven surfaces where the Gray uses only four.

| Location | Binary | Gray |
|---|---|---|
| 1 | | |
| 2 | \| | \| |
| 3 | \| | \| \| |
| 4 | \| \| | \| |
| 5 | \| \| \| | \| \| |
| 6 | \| \| | \| |
| 7 | \| \| \| | \| \| |

Essentially, the $x$-commutator bars or dots represent one 10 digit or two 5 digit combinations of ones and zeroes, the ones being represented by metallic dots or bars and the zeroes being represented by blanks or blank spaces between the metallic dots or bars. The metallic bars representing the ones are embedded in the insulating material so as to offer no resistance to wipers travelling over the surface. As will be seen in FIG. 7, in this embodiment, there are ten brushes passing over the $x$-commutator (two rows of five each). As stated above, there is a common ground; therefore, when the carriage stops and a key is depressed, current will pass through certain of the brushes and bars and will not pass through others. To retain severality and resolution with wear, metallic (preferably steel) "heels" may be welded on as contact surfaces for the brushes.

Figure 7:
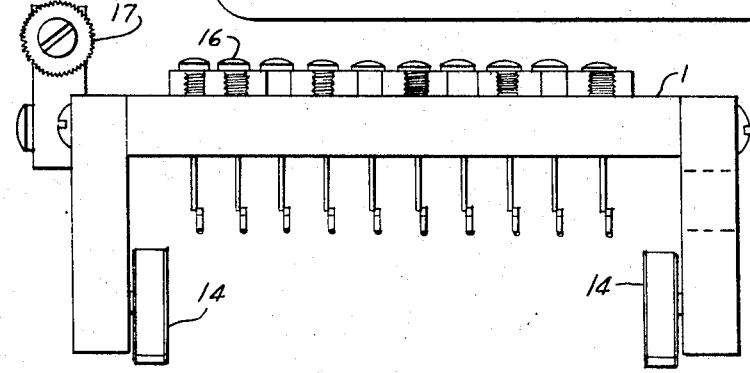
FIG. 7 is a side elevation view of the brush support (with brushes) of the planar commutator.

FIG. 7 shows in detail the structure of brush support 1, which operates in conjunction with the planar commutator or $x$-commutator 2, is mechanically coordinated with the carriage by link 18 (FIG. 6), and is mechanically adjustable with respect thereto by horizontal adjusting screws 17. The $x$-commutator 2, of course, is affixed to the carriage of the typewriter. The $x$-commutator brush support 1 is provided with rollers 14, which in operation bear upon the other side of $x$-commutator 2. Extending downwardly from the top of brush support 1 are two rows (5 each) of brushes 15. At the top of brush support 1 are corresponding rows of wire-connectors 16.

Figure 8:
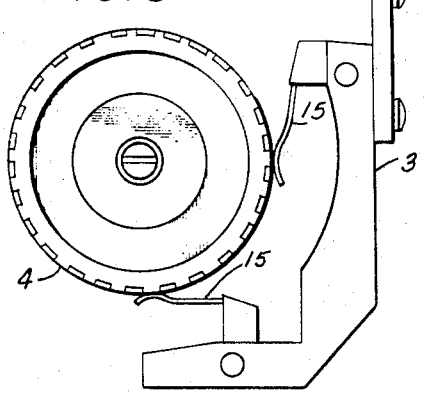
FIG. 8 is an elevation view of the circular platen commutator.

FIG. 8 shows a detailed structural elevation view of the typewriter carriage and platen, mounting $y$-commutator 4 and $y$-commutator brush support 3. Brush support 3, is, of course, rigidly attached to the carriage. Like the $x$-commutator brush support it bears two rows of four brushes. There are 60 discrete circular or $y$ positions on the typewriter for which this particular modification is designed. Like the $x$-commutator, the $y$-commutator also has Gray plus Parity coded conductors within the circular nonconducting surface.

Figure 9:
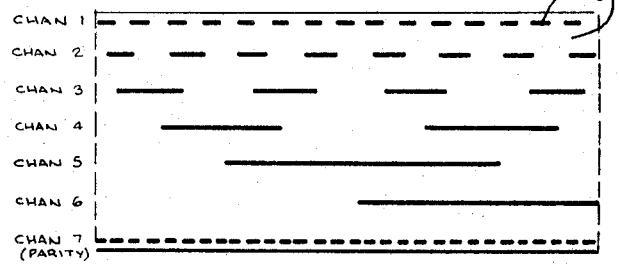
FIG. 9 is a diagram of the contacts of the circular commutator.

FIG. 9 is a schematic drawing showing the relative locations of the metallic contacts 12 embedded in the insulating material 13 of $y$-commutator 4. This coding has been engineered to suit this particular typewriter and the chemical usage to which this particular typewriter has been adapted for purposes of this embodiment. For other usages, it may be desirable to code more than one turn of the platen. This can be accomplished for instance, by use of a counter.

Figure 10:
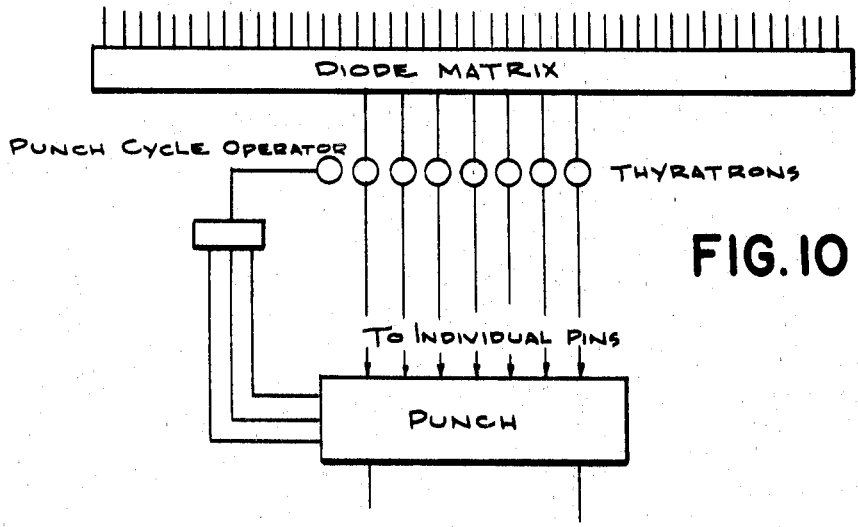
FIG. 10 is a schematic diagram showing the relationship of the essential elements of a commercially available asynchronous character encoding tape punching typewriter, one of many types which is suitable for modification in accordance with this invention.

FIG. 10 shows schematically the normal function of a commercially available asynchronous punch coding typewriter suitable for modification in accordance with the instant invention. While the instant invention is not limited to any particular brand or make of such a typewriter as explained above, it is, of course, necessary to arbitrarily limit, generically, the structure of the typewriter, as the description of the structure of this invention becomes more detailed. The operation depicted at FIG. 10 is known to those skilled in the art but is referred to here for reference purposes. When a particular key character button of the typewriter is depressed, the key bar is raised through a mechanical linkage. When the key approaches to within approximately ⅜ of an inch of the platen, an electrical trip action takes place through the wiping of a ground. Simultaneously a mechanical action starts the carriage movement. This electrical action or electrical ground action is unique for the particular key character. The current goes through a diode matrix wherein it is encoded into a combination of one or more circiuts leading to thyratron tubes as shown in FIG. 10. These thyratron tubes have the power handling capability of activating one or more of the appropriate code magnets which in turn set the punch for the particular code. As the punch is set, free punch levers fall forward, proceeding no further towards the actual punching of the tape until acted upon by a punch clutch magnet which is controlled through a master control relay on coil 21. In addition to the firing of one or more of the seven thyratron tubes which act upon the individual code magnets, an eighth thyratron tube always fires to activate the master control relay coil 21, contacts of which are instrumental in performing many of the essential functions of this typewriter and the modification in accordance with this invention. One of the functions of the master control relay is to energize the punch clutch magnet; that is to say, to energize the punch cycle through a clutch known as the punch clutch. It should be noted at this point that an object of the instant invention is to sequence in subsequent coded information viz. the Cartesian coordinates of the character, after the code for the character has been punched on the tape. Accordingly, the punch clutch, described above, is maintained, according to the instant invention, in a position so that the punch shaft continues to punch information which is fed into the punch through the thyratron tubes. During this time a cam on the punch shaft cuts off the thyratron tubes (which are operated by D.C. current) on each rotation of the punch shaft. This enables a new combination to be sent to the code magnets. This thyratron reset cam is known as the "punch cam." When all information on the x and y coordinates has been punched, which will have occurred after the fifth revolution, the punch clutch is disengaged, and the punch stops.

Figure 11:
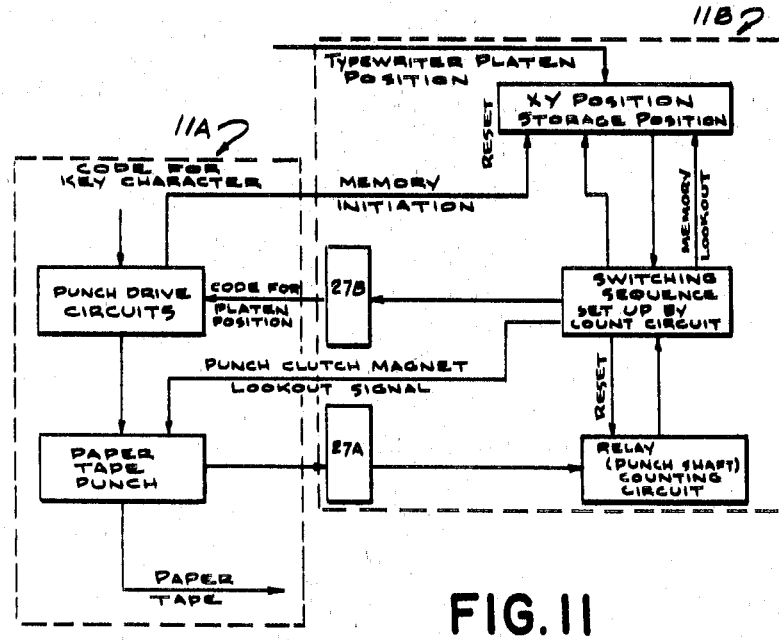
FIG. 11 is a more detailed block diagram of the system set out generally at FIG. 4.
Figure 12:
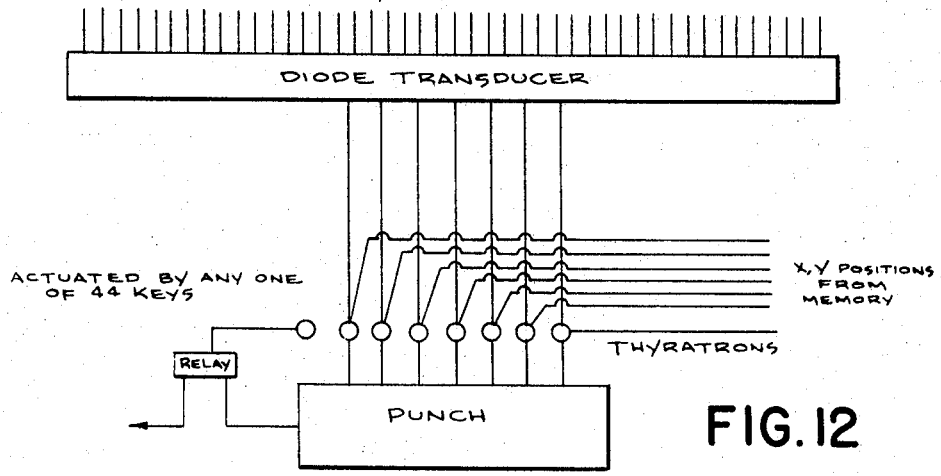
FIG. 12 is a schematic diagram showing essential elements of the special circuitry of the instant invention and its relation to the existing circuitry of the commercially available tape punching typewriter.

FIGURES 11 and 12 show schematically the modifications of the asynchronous coding typewriter in accordance with the instant invention. So much as pertains to FIG. 11, block 11A represents the asynchronous coding typewriter without the modification of the instant invention and block 11B shows the interrelation of the instant invention elements one to another, and of the combination to the basic typewriter. The punch drive circuits of FIG. 11 are operated by the thyratron tubes shown in FIG. 10. As shown in more detail in FIG. 12, the information from the x, y position storage circuit is fed into the existing circuits above the thyratrons; that is to say between the thyratron tubes and the diode matrix. This information is fed into the punch drive circuits, at the proper time, being regulated by the relay counting circuit. The relay counting circuit is controlled by a contact 27A (FIG. 16) operating on coil 27 (FIG. 13) which is energized at the beginning of each punch cycle, and which, through a switching sequence controlled by the relay counting circuit and again through normally closed contact 27B (FIG. 14) operated from coil 27 causes the x, y position information to be transmitted to the punch drive circuits in successive cycles. The reset lines shown in FIG. 11 function in the same way as is shown in FIG. 3. Detailed operation of the various circuits and components is described below.

FIGURES 13–16 show in detail the circuitry of the modified asynchronous chemical encoding typewriter described more generally above.

Figure 13:
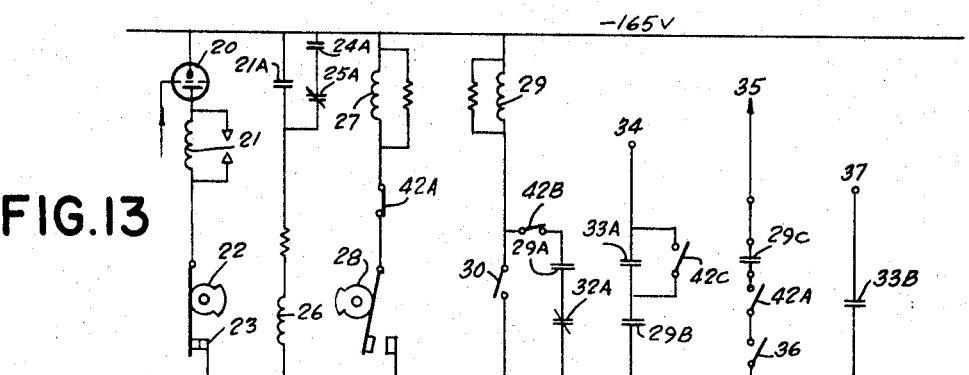
FIG. 13 is a detailed circuit diagram showing the various functions of the instant invention, in conjunction with the commercially available tape punching typewriter.

A starting and stopping circuit for the punch is shown at FIG. 13 where the thyratron tube 20 controls the master control relay on coil 21, which is described above as the tube which always fires when a type key is pressed. Punch cam 22 opens and closes contact 23 as the constantly rotating punch shaft turns, each revolution of the shaft, therefore, resetting thyratron 20 as well as the other thyratrons controlling the current to the code magnets. Normally open contact 21A, operating on coil 21, closes upon the energizing of coil 21 to operate punch clutch magnet 26 which causes the actual punching of the tape by the individual punches which were set up during this phase. It will be noted that normally open contact 24A, operating on coil 24 (FIG. 16, described in detail below) will also operate the punch clutch magnet, as required, for the subsequent punching of information relative to Cartesian coordinates, which information has been stored awaiting availability of space on the punch tape.

To the immediate right of the circuit described above, at FIG. 13, is the punch cycle detection circuit which initiates the counting circuit, described below (FIG. 16) and which holds off any new code configurations until the end of the counting cycle. Coil 27 has its operation controlled by a normally open special punch cam 28, which cam operates, like cam 22, on the punch shaft. Cam 28 closes the circuit at the start of the punch shaft rotation which rotation starts approximately 35 milliseconds after depression of a key. Coil 27, with an operation time of 5 ms. operates to apply voltage, through normally open contact 27A to coil 24 of the sequence and counting relay in FIG. 16, contacts of which coil operate after another time lapse of 6 ms. It is a function of coil 27, therefore, to initiate the operation of the counting and reset circuit (FIG. 16) the function of which circuit is to select and admit the code that will be reproduced as punch magnet configuration in the next punch cycle.

To the right of the punch cycle detection circuit of FIG. 13 is the coding and normal carriage spacing circuitry of this detailed embodiment, which shows the tying in of the novel features of the instant invention to the structure and function of the commercially available asynchronous coding typewriter. Specifically, the carriage movement must be so regulated as to insure that the x, y memory circuit is excited and isolated before the carriage starts to move to accommodate the next key action. By delaying this movement until the end of the first punch cycle, scrambling of information in the memory circuit is avoided. See also FIG. 15. Pull wire switch 30, operating from the type bar energizes coil 29. When coil 29 is energized, it locks itself in through normally open contact 29A so long as normally closed contact 32A remains closed and switch 42B is manually closed. Switches 42A and 42C–42E are manual and are shown in the "code" mode. All switches 42 (42A–42E) are manually combined for single switch operation between "code" and "normal" functioning. With coil 29 locked in, and contact 29B closed, actuator coil 34 has only to wait until the end of the first punch cycle when normally open contact 33A, on coil 33 (FIG. 16), will close. With respect to the "normal" (noncode) mode, spacing coil 29 controls the coding of spaces as shown at FIG. 13 where contact 36 is the space wiper ground and normally open contact 29C, on coil 29, when open, passes a space signal to the space matrix 35.

Figure 16:
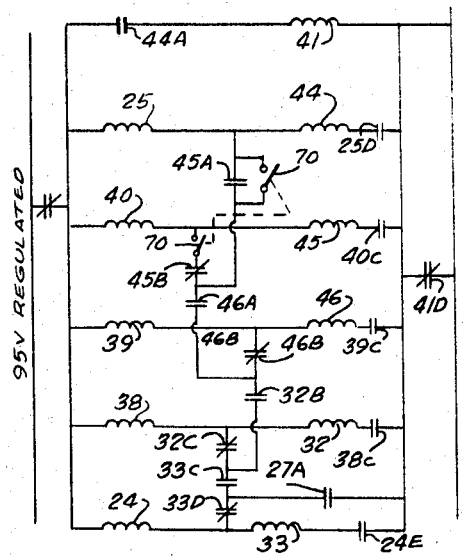
FIG. 16 is a detailed circuit diagram of the punch shaft counting and reset circuit of the embodiment depicted in FIG. 13 above.

Locking of the keyboard with keyboard lock 37 during the encoding of Cartesian coordinate information is accomplished by contact 33B on coil 33 (FIG. 16).

Figure 14:
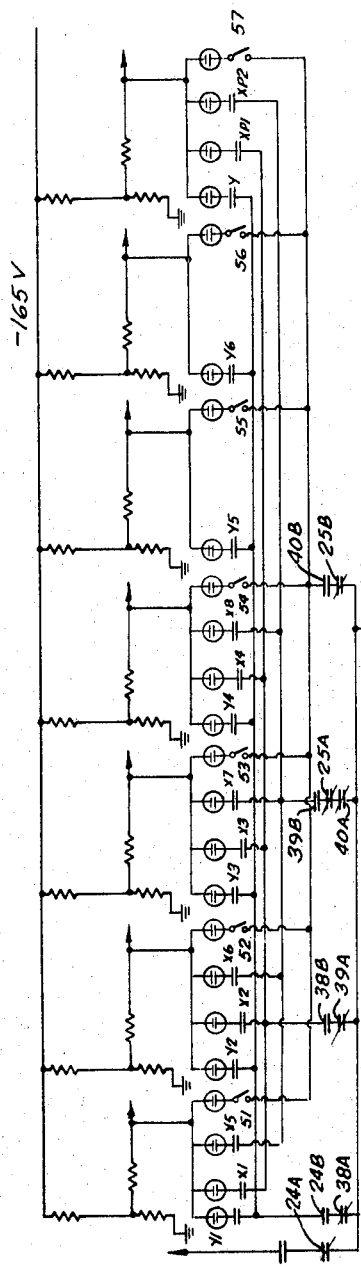
FIG. 14 is a detailed circuit diagram of the position encoding punch matrix of the embodiment shown in FIG. 13.
Figure 15:
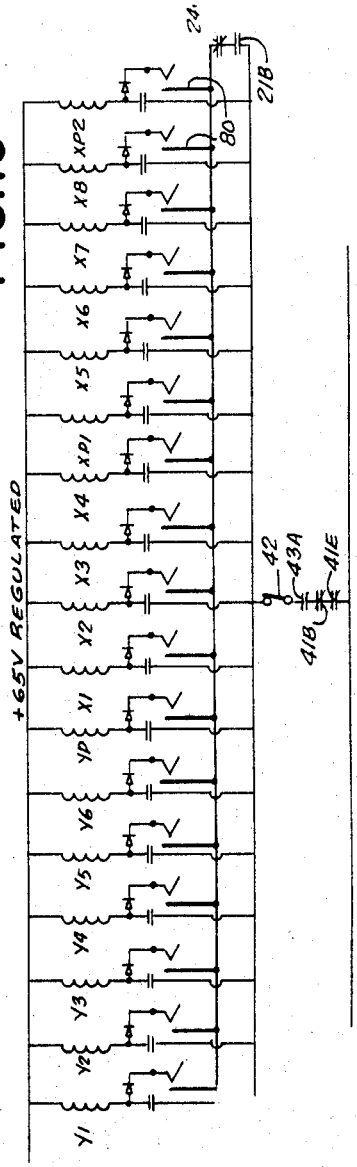
FIG. 15 is a detailed circuit diagram of the $x$, $y$ storage and reset circuit of the embodiment shown in FIG. 13.
Figure 17:
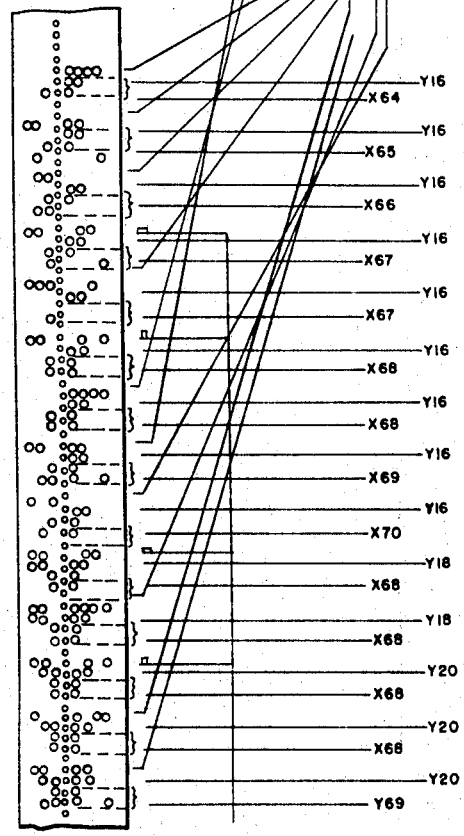
FIG. 17 shows the actual generation on tape of chemical information according to the preferred embodiment.

FIGURES 14 and 15 show the position encoding punch matrix and x, y storage and reset circuit respectively for the encoding and storage of the Cartesian coordinate information. Diode matrixes such as that shown in FIG. 14, are well known in the art and are not claimed to embody the invention except insofar as there is a unique relationship between the diode matrix and the other elements of this invention. No detailed explanation of the matrix itself is considered necessary, this being well known to those skilled in the art.

Contact 24C (FIG. 15) isolates the memory during encoding. Contacts 24B, 38A, 38B, 39A, etc., are all contacts operating off of coils included in the punch shaft counting and reset circuit (FIG. 16). Their relationship to the counting and reset circuit which circuit is explained in detail below, is a technique within the skill of the electronic technician.

FIG. 15 shows in some detail the storage and reset circuit operating in conjunction with the encoding punch matrix according to this invention. Again, the invention is not claimed to rely in the storage technique itself but only in its relationship to the other elements of the invention. The gate to the memory is a number of normally closed contacts 41C, 41B and 43A together with manual selector switch 42E. Since the coil 41, of the counting and reset circuit (FIG. 16) and 43A of a tape-feed and delete circuit are normally inactive during the coding process, it will be seen that this memory circuit is in fact controlled primarily by the contact 21B operating from the master control relay coil 21 which opens the circuit to the reception of information from the individual commutator contacts and brushes; and it is the opening of normally closed contact 24C which isolates the memory so that subsequent carriage movements would not manifest themselves in the circuit. When the key character is pushed, the configuration of brushes and contacts corresponding with those illustrated at FIGS. 6, 7 and 9, certain of the coils Y1, Y2, etc., lock themselves in and the information is passed to the corresponding contacts on the position encoding punch matrix.

FIG. 16 depicts in detail the punch shaft counting and reset circuit of this invention. As explained above, timing is of the essence. As the timing of each phase of operation is either tied in with or controlled by the circuit shown in FIG. 16, it may be said that this circuit is the "brains" of the invention. This circuit utilizes a counting technique by time relays which is old in the art. It is not the timing technique, but rather the coordination of the timing coils and contacts to the other elements of the invention, which is novel to this circuit. In addition, certain modifications such as the addition of coil 41 as well as normally closed contact 47 (operating from a coil not illustrated, and timed to insure against the introduction of spurious information) have been made. Referring momentarily to FIG. 13, it will be remembered that coil 27 is operated, under code, by the normally open special punch cam 28. Thus, cam 28 ties in the operation of coil 27 with the four punch cycles of the machine. Contact 27A of FIG. 16, operating on coil 27, starts the counting and reset circuit. Completion of the first punch cycle is marked by the energization of coil 38; the second, coil 39; the third, coil 40; and the fourth, coil 25. Current passes through the circuit initially through coil 24, normally closed contact 33D, and contact 27A, coil 27 having initiated the circuit action.

As the punch cycle nears completion, coil 27 releases, opening contact 27A, thus energizing coil 33 (through contact 24E), which, in turn, opens normally closed contact 33D and closes normally open contact 33C. This completes the first punch cycle. At the start of the second punch cycle contact 27A closes and current is passed through coil 38, normally closed contact 32C, contact 33C and 27A to permit energization of coil 38. Energization of coil 38 closes contact 38C. Towards the end of the second punch cycle at this point contact 27A will reopen energizing coil 32. As each coil picks up it is locked in. This process continues until the fifth punch cycle (completed by the energization of coil 25A) has terminated at which time contact 44A operating from coil 44 closes and coil 41 is energized. Double pole switch 70 rotates coils 40 and 45 causing coil 25 to operate on the fourth instead of the fifth when only four punch cycles are desired. Coil 41 has been added to the counting circuit simply to open the circuit and to avoid the necessity of using coil 44 to open itself in a bootstrap operation. The entire punch counting and reset action is terminated by the opening of normally closed contact 41D, which shuts off the entire circuit and allows each relay to reset. The function of the counting and reset circuit is to allow the punch shaft, after the typewriter key had been depressed, to make five (or four) revolutions rather than one as in the normal operating condition. The circuit counts each revolution and sequences its contacts accordingly. The punch clutch magnet is held energized by two sets of contacts (24A and 25A, FIG. 13) for five (or four) revolutions of the punch shaft. The normally open contact 24A is closed by the first revolution and the normally closed contact 25A is open by the fifth (or fourth revolution.

It will be noted that five punch cycles are described. However, it is only necessary that two punch cycles be utilized for the X information and one punch cycle for the Y information in addition to one for the character. In this connection see FIG. 15 wherein six Y positions and one Y parity circuit are shown, this constituting all of the Y information necessary. This Y information can be handled in one punch cycle. The fifth punch cycle is desirable but not essential and, in this modification, is used as a stop code. The stop code is permanently switched in by switches S1 through S7 (FIG. 14) and need only to be generated by the thyratrons at the correct time for punching, by contacts 25A, 25B, 40A and 40B. This is in contrast to the X and Y codes which are generated at the time the character code is obtained and must be stored in a buffer memory until the proper time for punching.

In summary the counting circuit of FIG. 16 keeps track of both the beginning and the end of the punch cycle, performs the desired switching in a sequential manner, terminates the excitation of the memory, locks in the punch cycle clutch magnet during the four (or five) punch cycles, and resets the memory control and punch drive circuitry at the end of the fourth (or fifth) punch cycle. It also provides a delay signal for spacing the carriage.

Chronologically, the key character code is punched into the paper tape at about 50 milliseconds after the ground is transmitted through the thyratron tubes to the master control relay coil 21. In the last portion of the first punch cycle, 70 milliseconds after the ground, coil 27 relaxes and energizes the punch code magnets with a second punch cycle. The first 360 degrees of punch shaft rotation are completed at about 80 milliseconds after depression of the key. The second, third and fourth rotation of the punch shaft causes the same sequence of events as described above except that each time coil 27 and its contacts operate, new counting and sequencing relays operate, setting up a new code configuration and nullifying the code configurations determined by the previous cycle. As explained above, the relaxation of coil 27 in the fourth (or fifth) cycle results in the opening of the contact 41D resetting all control circuitry.

Figure 20:
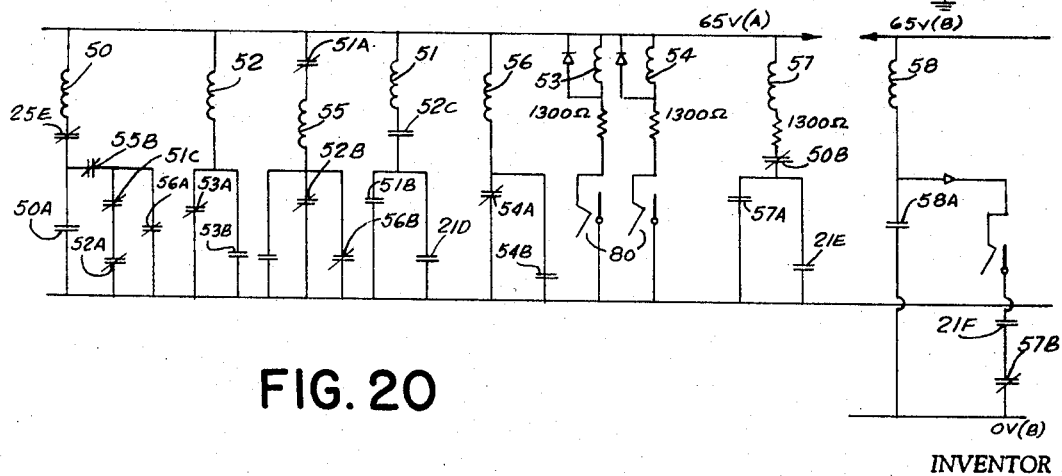
FIGS. 19 and 20 show the detailed circuitry represented by the block diagram of FIG. 18.
Figure 19:
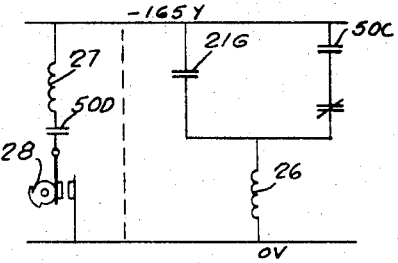
Figure 18:
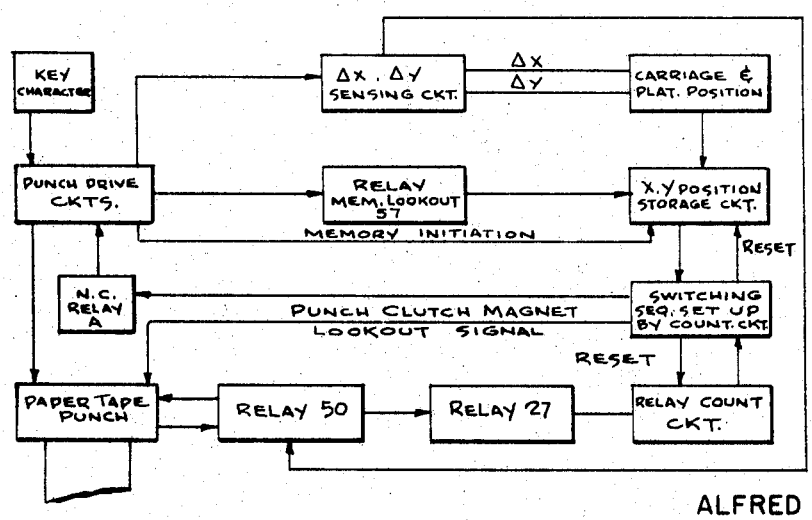
FIG. 18 is a block diagram of circuitry which may be added to that of the preferred embodiment to eliminate redundant coordinates.

FIGURES 18, 19 and 20 are descriptive of additional optional circuitry for the elimination of redundant coordinates. The basic circuitry of the preferred embodiment as described above will record the coordinates of every character typed. Oftentimes, however, it is not only unnecessary but inefficient as well for coordinates of every character to be recorded. The most common example of this situation is where characters follow each other in sequence on the same line. It is obvious in such a situation that the y-coordinate for each successive character will be the same while the x-coordinate will be one unit higher as the characters progress. It is therefore desirable, although not essential, to utilize what I choose to name "implied coordinates" where it is unnecessary to expressly record this information. To attain this objective it is necessary to provide the means for establishing automatically when a sequence is broken, that is to say, when a line is shifted or when the platen is moved manually, etc. The block diagram of FIG. 18 is nearly self-explanatory. The logic of the circuitry is simple. Upon the typing of the first character, the memory is filled with the coordinate information and is therefore isolated from further input. There is then no memory capacity available to contain the coordinates of the subsequent characters, which coordinates, consequently, will not be retained. A discontinuity of a normal sequence is sensed by a special circuitry causing the memory to dump the coordinates of the first character on to the tape. The memory, now being empty, is ready to receive the coordinates of the next character typed.

More specifically, the first key action, through the master control relay coil 21 (FIG. 13) operates punch clutch magnet 26 which starts the punch shaft rotation. Simultaneously the master control relay establishes contact with the x and y commutators described above allowing the memory to fill. The master control relay also operates relay (coil 57, etc.) a memory lockout which locks in and isolates the memory. The memory lockout is a slow operating relay (30 milliseconds) which allows sufficient time for the memory to fill between the isolation of the memory and the establishment of contact with the x and y commutators. As the master control relay does not operate relay 50, the pawl on the punch shaft falls back, stopping the shaft at the end of one complete rotation.

With the depression of the second and further consecutive key actions, master control relay 21 operates punch clutch magnet 26, again starting the punch shaft rotation. The master control relay does not lock in, allowing the pawl on the punch shaft to fall back causing the shaft to stop at the end of one complete rotation. The memory lockout is now keeping the memory isolated so that no new information can enter. Information contained in the memory corresponds to the coordinates of the first key character.

If the platen moves up and down, or if there is carriage motion not accompanied by character-key action, this will be sensed by a tripping circuit, whereupon tripping relay (coil 50, etc.) operates and locks in. Contacts of this relay then energize the punch clutch magnet starting punch shaft rotation. The relay also causes the counting circuit to switch in through relay 27. The punch shaft will therefore rotate five times whereupon the punch clutch magnet will be de-energized by normally closed contact 25F (FIG. 19). The tripping relay also releases the memory lockout relay 57.

In ordinary typing, or typing on the same line with each character immediately following the preceding character (considering here a space as a character) there will be no tripping action. However, if such a typing sequence is interrupted by moving the carriage or platen manually or by means of certain keys (tabulator or carriage return), the tripping action will be initiated. The necessity for tripping is determined by monitoring the $x$ and $y$ parity wipers 80 corresponding with coil YP (Y parity) and coil XP1 and XP2 shown at FIGS. 15 (and 20) and the starting of the punch action following the depression of a character key. Tripping action is initiated when there is a parity change on the $y$-commutator or a parity change on the $x$-commutator not following an immediately preceding character key action. Tripping action will not occur if a parity change of the $x$-commutator follows immediately the striking of a key character or if the last action to have taken place was a tripping action and not a character key action. Differentiation between key characters and other keys such as the tabulator key or the carriage return key is obtained by leading the signals generated by the latter keys to an "ignore" line. These signals therefore do not actuate the master control relay and are not punched on paper tape.

Following the above logic on the more detailed FIG. 20, contact 21D operating from master control relay coil 21 (FIG. 13) operates relay 51 and locks it in. Normally closed contact 51C now prevents the subsequent release of coil 52 from operating the tripping relay 50. After relay 52 detects $\Delta x$ from the carriage movement, relay 51 is reset. This is descriptive of key action followed by $\Delta x$.

In the absence of key action, after relay 52 detects $\Delta x$, the tripping relay 50 is momentarily operated by normally closed contact 52A which locks in the circuit. Relay 27 is then connected to cam 22 through contact 50D and the punch clutch magnet 26 is energized for five cycles and later de-energized by contact 25F (see FIG. 19); thus, $x$ and $y$ coordinates of the first character are punched out. Normally closed contact 25F resets punch clutch magnet 26 as well as relay 50 through contact 25E. When coil 50 is activated the memory lockout relay 57 resets, thus making the memory receptive to the next key character action.

For the detection of $\Delta x$ or $\Delta y$ following the action of relay 50, normally closed contacts 52B or 56B momentarily operate relay 55 which locks itself in. As relay 55 is slow to operate, it will prevent any $\Delta x$ or $\Delta y$ after the first measurement to operate tripping relay 50. The next key character action of the master control relay will reset relay 55 through normally closed contact 51A operating from coil 51.

Detection of $\Delta y$ in the absence of key action is identical to the detection of $\Delta x$ in the absence of key action except that relay 56 detects $\Delta y$ and it is not tested for preceding key action.

In the absence of the instant circuitry to eliminate redundant coordinates, as was described above with respect to the principal embodiment, the carriage movement was delayed until the counting relay 33 was set in operation. With the utilization of the instant circuitry, a fixed time delay is used instead, delaying 60 milliseconds from the time the master control relay thyratron fires.

Correction of errors may be accomplished without backwinding the tape or otherwise finding the erroneous code on the tape. Since each typed character is accompanied, implicitly or explicitly by its coordinates, a computer will have all the necessary information for making an erasure if, at any later time, there appears a character identical (in designation and coordinates) to one previously recorded, and which is preceded by an "erase" code. This "erase" code, which need not be a cancelling perforation, may be obtained by depressing a button, and coordinates identical to those of the erroneous character, are obtained by overtyping the latter.

On commercial typewriters, there is a lever used to select black or red color type. Instead of the usual corresponding black and red ribbons, there is also black and white ribbon available commercially. The lever which controls the color may be so wired that, when it is thrown to "red" (or "white"), the "erase" code is perforated on the paper tape, and when it is thrown back to "black," a "normal" code is perforated. If a black and white ribbon is used in the "white" mode, all characters will be typed in white, which is invisible on ordinary paper; and if a black character is overtyped in white, it becomes invisible. With a typewriter so equipped, error correction becomes quite easy and foolproof. When the typist wants to correct an error, she throws the color lever into "white" which also injects now the "erase" code into the paper tape. She then positions the typewriter platen so that the next character will overstrike the erroneous one. If she does this overstriking correctly, the erroneous character will visibly disappear. She then throws the color lever to black, which injects the "normal" code on the paper tape, and she now can type the correct character in.

Thus, whatever is visible on the typed page corresponds, character for character, with what is coded for the computer. The paper tape need never be examined, nor its progress be interfered with.

In the application of the instant circuitry to the chemical typewriter, although all atoms and bonds must be associated with their coordinates, it is possible to have a computer perform this action in many cases instead of the typewriter. The typewriter would then determine a few basic coordinates such as the coordinates of the first character on a line and from this a computer can assign the coordinates to the subsequent characters if they follow without interruption by incrementing the value of X by one for each consecutive character. By having a computer assign the nonbasic coordinates there is less punching action by the typewriter and a consequent reduction in wear and tear in typewriter equipment as well as less tape to store. Further, limitations of typewriter speed due to multiple cycling of the punch are avoided.

In the typewriter described, coordinates are recorded in addition to the typed symbols, and it becomes therefore possible to use relationships among coordinates as instructions for a computer. Of course, this is precisely what is done in coding chemical structures, but in other fields, other results can be achieved with these relationships. Such possibilities seem to indicate that this application may turn out to be a technique of very general applicability.

For instance, if the fraction ⅝ is typed out, the $y$-coordinate of one number (8) will be higher than that of the fraction lines, and the $y$-coordinate of the other number (5) will be lower. It is a simple matter for a computer to determine this fact, and to use it then as an instruction to divide the numeral with the higher coordinate by the one with the lower. If the symbol = is typed after the fraction, this may serve as an instruction to write out, at that place, the result of the computation. Similarly, if a + sign separates two numbers with the same $y$-coordinate, but with respectively lower and higher $x$-coordinates, it signifies addition. With an appropriate keyboard, any mathematical equation may be typed, to be solved thereupon without any further ado. No programming experience is required of the user.

If the typewriter is equipped with a keyboard of discrete electronic symbols, such as

and again, provided a suitable program has previously been written, circuit diagrams may be typed out, and the computer will be capable of tracing out such circuits, checking for inconsistencies, calculating values for some components, and the like.

In the present state of the art, it is possible to enter clear text into a computer by means of either a tape-typewriter, which may communicate with the computer on-line or through coded tape, or by using a key-punch, through punched cards. Much information is not recorded as clear text, however, but as tabulated material, including filled-in questionnaires and sundry forms. Entering such material into a computer is considerably more difficult. The difficulty is a function of the number of questions on the form. If their number is small, the situation is not too difficult but the difficulty increases as the number approaches a certain limit.

If there are but a few questions, and a tape-typewriter is used for computer input, the questions on the form may be made to correspond to columns on the paper in the typewriter. A typist transfers the data from question to column, and the content from separate forms goes onto separate lines. On the corresponding paper tape, column is distinguished from column by the tabulator code (or similar signal), and since the questions are always entered in the same order, there will be no confusion; line is distinguished from line by the carriage-return code. On punched cards, each question heads a field into which is punched the corresponding data; the contents of separate forms is recorded on separate cards.

As the number of questions increase, it becomes more difficult to accommodate their answers on a single line on a typewriter, or across the 80 columns of a punched card. To save space, data is coded or abbreviations are resorted to. The format of the questionnaire may be altered, so that no more is asked than what will fit onto one line, or, a form may be coded only partially, leaving it to a clerk to obtain the noncoded information, if and when needed. It is also possible to divide the input operation into several steps, each of which is entered on separate cards, or at different times. After some processing and data reduction, it may be possible to merge this data again.

Commercial equipment is available, in which mechanical cams are made to correspond to certain instructions. By typing into a certain column, a cam covering this column may instruct a small computer to add the number typed to the previous number in this column, or cause the computer to perform similar operations. Typing into the last column may, for instance, cause the computer to switch from one gear of cams to another, and in this way, it becomes possible to enter different types of information into one column. Such equipment, however, is cumbersome to use; and a train of cams is a delicate and bulky item, so difficult to reprogram, that it is preferable to have a separate train for each form. Consequently, these devices are of use mostly in billing operations in which there is very little variety. There is in use another method for coding complex forms, which does not make use of special hardware. In this method, a tape-typewriter is used, a form is inserted, and by means of the carriage-return, space bar and stop code, the form is made to advance and to stop at every question. The paper tape cut in this process is used whenever, thereafter, that form is filled in. The operator pushes the "read" button, waits till the form stops moving, then fills in the answer to the question at which the form stopped, and so on, till all questions have been answered. In this fashion, the answers will always be in the correct order, and can be interpreted by a computer. This method, however, involves much idleness on the part of the operator; furthermore, because a prepared tape is required for each different form, tape handling may become a problem if there is any variety in the forms processed.

If it is not possible to use any of the above methods, it will be necessary to code, in addition to the answers, the questions themselves. In other words, each data entry will be preceded by a coded question, which functions as a label. This method is very general in its applications; all other methods are merely variations of this one, the variation consisting only in the means used to obtain, with lesser effort, the label.

It has developed that the chemical typewriter illustrated herein, if provided with a regular keyboard, would be an ideal device for encoding forms. The only extra effort required of the typist is the filling in, in some designated area, of a form-identification symbol. Otherwise, she merely types in the answers, in whatever order, pellmell, without regard to either the sequence of the questions filled in or of the sequence in which the forms are used. Nor does size or shape of a form, or the number of its questions, matter. It is possible also to use the same form at a later time for entering additional information.

In my chemical typwriter, each keystroke generates a set of coordinates. These coordinates may function as a label for each answer typed onto a form. The reason this is possible is the fact that any data, if located within a well definable area on the form, must be the answer to a certain question. It is possible to so define, in terms of coordinates, all areas on a form, and to program a computer accordingly. A common origin to the coordinates is provided by the typed-in form-identification symbol, which also serves to identify the particular form used from amongst the others whose programs may be stored together in the computer.

Another application applies to direct computer input. A commonly used method for entering instructions or other material into a computer memory is to prefix such material with a memory address, e.g. track 14, sector 9. In some instances, it may be advantageous, instead, to use a coordinates-recording typewriter, and let the coordinates be the address for the material typed. The sheet of paper in the typewriter will then constitute a representation of what is stored in the memory, and where, and vice-versa. In other words, by typing onto the paper one types directly into the memory.

Still another application is in the overtyping of projected maps. A map corresponding to the projected map is inserted into the typewriter, and the material to be projected in overlay is typed onto this map, at the appropriate places. The thereby generated coordinates will constitute sufficient information for the correct projection of the overlay display, if, upon inserting the map, an origin for the coordinates was obtained. This may be effected by means of typing a map-identifying symbol, similar to the form-identifying symbol of the preceding application. Similarly also, the typing of this symbol may actually be used as instruction for retrieving the corresponding lantern-slide that is to be projected.

Printing machines in general use today, compose one line at a time. That is, the typesetter has to finish entirely with the composition of one line before he can start with the next. While this limitation does not affect ordinary printing, it does entail considerable hardships in the composition of constructions, where the position of elements on one line depends on the position of elements on lines below. For instance, in composing a chemical structure, the typesetter would have to start with its highmost characters. He would have to evaluate precisely how much space to allow between these two characters, so that the portions of the structures to be added on the following lines will fit neatly into the spaces provided them.

The difficulties of composing in this fashion are such, that in the past, chemical structures have only rarely been composed. Preference is given to printing them from cuts made from hand-drawn structures.

Similar difficulties exist in other two-dimensional material, such as mathematical expressions, electronic and other diagrams, graphs and the like. Recently developed photographic composing machines are capable, in theory at least, of going from one line to another and then back again. In practice, however, in the process of going back and forth between lines, a certain amount of backlash (i.e., loose play) of the film cannot be avoided, which results in noticeable misalignment on the composed page.

The chemical typewriter, as described in the preferred embodiment, has the ability to proceed in any direction, i.e., type backwards, forwards, upwards or downwards, and back and forth. Thus, the typist may start with a benzene ring (probably picked up from prerecorded tape), then proceed to any group, and on to completion. The coded tape obtained as a result of this operation may be fed to a computer, which, using the recorded coordinates as cues, can rearrange the typed material line by line, introduce the necessary spaces and carriage-returns, and deliver a tape that can be used to drive the typewriter, which then will type out this structure line by line, and not in the somewhat random fashion it was first produced. The chemical typewriter records positions only as discrete values; misalignments introduced through backlash when typing for coding (first typing) will therefore not be recorded on tape. Furthermore, in addition to the line-by-line rearrangement, a computer could easily insert, onto the output tape, instructions specifying type size, etc., so that these rearranged tapes may be used to drive composing machines capable of being controlled by tape. In this fashion, the same high-quality printing, possible for linear material, becomes possible with the same ease, also for chemical structures, mathematical expressions, sundry diagrams, and two-dimensional material in general.

The chemical typewriter, with its limited keyboard, will itself hardly be adequate to take advantage of the full capabilities for varying type and size, etc., with which modern printing machines are endowed. In this area, the electronic typewriter, described below, whose keyboard can be considerably expanded, is perhaps superior.

Chemical structures, if composed as described above, will at the same time be coded atom-by-atom. In other words, the tape produced as a result of the composing process may be duplicated, one tape going to the printing machine, the other to a computer, which may perform on it all the operations to which the atom-by-atom code lends itself.

Being printed is, to a chemical structure, its first appearance in public. To have its code available at so early a time, and with virtually no effort, constitutes a major contribution of the present invention. Furthermore, this process, causing the chemical coding of a structure to be automatically associated with the printing process, may eventually result in all printed structures being so encoded, in other words, in gaining computer access to the world's record of chemical literature.

At the present time, there is available commercially a great variety of character-generating cathode-ray tubes. Some of these use a "shadow mask" by which the passing electron beam is "shaped" to cast the corresponding character on the screen. Others use peripheral equipment, set to deflect a beam in such ways as to write any of a variety of preselected characters on a cathode ray tube screen. Generated in either way, characters can be assembled on the CRT screen in much the same way as they are assembled on paper by an ordinary typewriter. Because, however, unlike paper, the writing on a CRT screen is not permanent, it has to be maintained there by constant scanning of the electron beam. Some tubes have to be scanned repeatedly in short succession; others, the so-called "storage tubes," have a retentive screen, that needs to be scanned only at more or less infrequent intervals. Recent reviews of the state of the art in these cathode ray tubes include the article: "Computer Generated Displays," by R. T. Loewe et al., Proc. IRE, vol. 49, No. 1, January 1961.

If equipment such as the above is provided with a keyboard, it is possible to use this combination very much like an ordinary typewriter, or even a tape-typewriter, inasmuch as the typed characters are present in coded form, which can be transferred to magnetic or paper tapes. In the present state of the art, electronic typewriters do not compete with ordinary typewriters, nor even with tape-typewriters. This is, firstly, because the typed material does not remain as a permanent "hard" copy (although one could be obtained by photographing the CRT screen), and secondly, because the necessity for repeated scanning to maintain the display, puts a heavy economical burden on such a system. All that appears on the screen has to be repeatedly scanned; to accomplish this, a virtual facsimile of the material to be scanned has to be stored in a computer connected on-line to the CRT tube, or else, a computer-type memory, plus the necessary circuitry, has to be hooked-up to the CRT tube to handle the scanning. Both these arrangements are very expensive; and for this reason, character generating tubes have been used, in the past, mostly for computer-output displays.

It is most important that the electronic typewriter, consisting of a CRT, a keyboard, a computer-type memory with associated circuitry, can be used very efficiently in lieu of the chemical typewriter, for the coding of chemical structures.

The electronic typewriter corresponds to a combination of the mechanical typewriter (preferred embodiment) with a computer programmed for line-by-line rearrangement. Indeed, to depict a single character on the screen of the electronic typewriter, the entire cycle: mechanical (coordinates) typewriter-computer rearrangement-output on mechanical typewriter, is duplicated. Positioning, from the keyboard, of a character to appear on the screen, is done in much the same way as on a conventional typewriter. However, the character is not transferred directly onto the screen; instead, it is stored in the memory in the form of instructions for suitably deflecting the electron beam that will project this character on the screen. These instructions are called for once during every scan cycle. Furthermore, in equipment of this kind, these instructions are usually read out from the memory line by line, which is the way the scanning beam progresses. This means that the line-by-line chemical code of a depicted structure corresponds to one scan cycle, and may be obtained by transferring the contents of the memory onto tape.

That a line-by-line chemical code is identical to a coordinates-containing code of the type produced by the chemical typewriter (preferred embodiment) is evident from the fact that the one can be converted into the other, and vice-versa, by means of a computer (i.e., through an algorithm).

An electronic typewriter, using a tube with built-in shadow mask, will be strongly limited in the total number of characters available, as is the mechanical typewriter. But if characters are generated with equipment peripheral to the cathode ray tube, the number of characters available may be as large as desired. It becomes thus possible to include in the chemical keyboard heavy and dotted lines, to denote spatial relationships in the manner customary in chemistry. More lines, at various angles, could also be made available, so that projections of true three-dimensional models of chemical structures may be typed with the keyboard. The coding of chemical structures assembled with these additional keys is no different from the coding of the simpler structures generated with the mechanical typewriter, and codes generated with either system will be compatible, except, of course, that the more complex keyboard cannot be outputted directly on the simpler one.

Another advantage of the electronic typewriter is that errors can be visibly corrected. Also, the transfer of prerecorded portions of structures, such as the benzene ring, onto the screen is much faster than the corresponding process with the tape-typewriter. Finally, the ability, that can be built into most CRT displays, of moving parts of the displayed material about, is invaluable in composing for a printing machine.

I claim:

1. A Cartesian coordinate position encoding typewriter having a platen, chassis, and carriage, comprising means for sensing the relative position between said carriage and said platen, means for sensing the relative position between said carriage and said chassis, means for encoding information concerning said relative position between said carriage and said platen, means for encoding information concerning the relative position between said carriage and said chassis, and tape punching means for recording all of said encoded information.

2. In combination with an asynchronous tape punching typewriter having a platen, a chassis, and a carriage, the improvement comprising means for sensing the relative position between said carriage and said platen, means for sensing the relative position between said carriage and said chassis, means for encoding information concerning said relative position between said carriage and said platen, means for encoding information concerning said relative position between said carriage and said chassis, and tape punching means for punching all of said encoded information.

3. In an asynchronous tape punching typewriter having a platen, a chassis, and a carriage, the improvement comprising means for sensing the relative position between said carriage and said platen upon a demand signal initiated by keyboard action, means for sensing the relative position between said carriage and said chassis upon a demand signal initiated by keyboard action, means for encoding information concerning said relative position between said carriage and said platen, means for encoding information concerning said relative position between said carriage and said chassis, storage means for said information concerning said relative position between said carriage and said platen and between said carriage and said chassis, sequentially controlled release means for said encoded information concerning said relative position between said carriage and said platen and said relative position between said carriage and said chassis, said release means enabling fragmentary sequential release of information from said storage means, and tape punching means for said information concerning said position between said carriage and said platen and between said carriage and said chassis, said tape punching means being operative upon fragmentary receipt of said information from said storage means.

4. In an asynchronous tape punching typewriter having a platen, a chassis, and a carriage, the improvement comprising a commutator having a plurality of contacts and brushes fixed between said carriage and said platen so as to sense the relative position between said carriage and said platen; a commutator having a plurality of contacts and brushes fixed between said carriage and said chassis so as to sense the relative position between said carriage and said chassis; encoding means for information concerning said relative position between said carriage and said platen, encoding means for information concerning said relative position between said carriage and said chassis; tape punching means for all of said encoded information; and controlled delay means for sequentially feeding said encoded information from said encoding means to said tape punching means.

5. In an asynchronous tape punching typewriter having a platen, a chassis, a carriage, individual keys, key information encoding means, and key code tape punching means, the improvement comprising means for sensing the relative position between said carriage and said platen including a commutator having a plurality of contacts and brushes; means for sensing the relative position between said carriage and said chassis including a commutator having a plurality of contacts and brushes; demand signal means responsive to action of said individual keys and actuating each of said position sensing means; means for encoding information concerning said relative position between said carriage and said platen; means for encoding information concerning said relative position between said carriage and said chassis; tape punching means for said information concerning said relative poistion between said carriage and said platen and between said carriage and said chassis, said tape punching means coordinated with said key code tape punch means; storage means for said encoded information concerning the relative position between said carriage and said platen; storage means for said information concerning the relative position between said carriage and said chassis; and sequentially controlled release means for said information concerning the relative position between said carriage and said platen and between said carriage and said chassis, said release means responsive to control by said tape punching means so as to be delayed in reaching said tape punch means until after punching of said key code.

6. A typewriter as defined in claim 1 and further comprising a keyboard having a plurality of symbols, said sensing means being responsive to the selection of a symbol for actuating said encoding means to provide coded information concerning the relative position between said carriage and said platen and said carriage and said chassis to thereby denote the position of said selected symbol.

7. A typewriter as defined in claim 6 and further comprising means for encoding information concerning said selected symbol and said recording means recording said symbol information together with said position information.

8. A typewriter as defined in claim 7 wherein said recording means includes a tape punch.

References Cited

UNITED STATES PATENTS 3,046,534 7/1962 Constant.
3,091,387 5/1963 Locke _____ 234—124 X
3,175,763 3/1965 Gotz et al. _____ 234—65 X WILLIAM S. LAWSON, Primary Examiner U.S. Cl. X.R.

197—1.6; 234—58, 60, 65, 89, 123; 235—60.5, 60.53